US007246747B2

(12) United States Patent
Bremer et al.

(10) Patent No.: US 7,246,747 B2
(45) Date of Patent: *Jul. 24, 2007

(54) MULTI-FORMAT BAR CODE READER

(75) Inventors: Edward C. Bremer, Victor, NY (US); Alexander M. McQueen, Eugene, OR (US); Craig D. Cherry, Eugene, OR (US); Brad R. Reddersen, Dublin, CA (US); Steven A. McMahon, Pullman, WA (US)

(73) Assignee: Datalogic Scanning, Inc., Eugene, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/500,630

(22) Filed: Aug. 7, 2006

(65) Prior Publication Data

US 2007/0001014 A1    Jan. 4, 2007

Related U.S. Application Data

(63) Continuation of application No. 10/247,278, filed on Sep. 18, 2002, now Pat. No. 7,137,555, which is a continuation-in-part of application No. 09/515,659, filed on Feb. 28, 2000, now abandoned.

(51) Int. Cl.
*G06K 7/10*    (2006.01)
(52) U.S. Cl. ............................ 235/462.07; 235/462.01; 235/462.11; 235/462.32
(58) Field of Classification Search ........... 235/462.11, 235/462.14, 462.21, 462.43, 462.07, 462.08, 235/462.12, 462.32, 462.33
See application file for complete search history.

(56) References Cited

U.S. PATENT DOCUMENTS

| 4,000,397 | A | 12/1976 | Hebert et al. ......... 235/61.11 E |
| 4,939,355 | A | 7/1990 | Rando et al. ............... 235/472 |
| 5,140,141 | A | 8/1992 | Inagaki et al. ............. 235/462 |
| 5,235,167 | A | 8/1993 | Dvorkis et al. ............. 235/462 |
| 5,352,879 | A | 10/1994 | Milch .......................... 235/466 |

(Continued)

FOREIGN PATENT DOCUMENTS

EP        0460669 A2    12/1991

(Continued)

OTHER PUBLICATIONS

"Optical Data Collection with Rotating Facet Mirrors," Research Disclosure Journal, ISSN 0374-4353, Kenneth Mason Publications Ltd., Mar. 1997, 2 pages.

(Continued)

*Primary Examiner*—Seung Ho Lee
(74) *Attorney, Agent, or Firm*—Stoel Rives LLP

(57) ABSTRACT

Methods and apparatus are disclosed for selectively reading a barcode, symbol, or other indicia by either scanning the barcode with a flying-spot scanner, or by imaging the barcode, thereby improving reading performance by tailoring the reading method to the particular item that is being read. Both a flying-spot laser scanning front end and an imaging front end are incorporated in a single device. Data obtained by the selected reading method is decoded and output. A common decoder or separate decoders may be used to decode the data from the two front ends. A single image sensor may be shared between the flying-spot front end and the imaging front-end, with a limited readout area utilized for laser scanning. The size of the readout area may be adjusted based on detected target proximity. Selection of the reading mode may be based on criteria including manual input, the range of the target, or previous failed attempts to read the barcode using either reading method. An integrated data reader in a console configuration may include a window having a special area in the corner or elsewhere for collecting data by presentation to the imaging front-end, with the flying-spot front end, with its larger depth of field, being utilized for general scanning through the window.

9 Claims, 7 Drawing Sheets

U.S. PATENT DOCUMENTS

| | | | |
|---|---|---|---|
| 5,378,883 A | 1/1995 | Batterman et al. | 235/472 |
| 5,463,211 A | 10/1995 | Arends et al. | 235/462 |
| 5,468,951 A | 11/1995 | Knowles et al. | 235/462.22 |
| RE35,117 E | 12/1995 | Rando et al. | 235/375 |
| 5,504,316 A | 4/1996 | Bridgelall et al. | 235/462 |
| 5,600,121 A | 2/1997 | Kahn et al. | 235/462.48 |
| 5,691,528 A | 11/1997 | Wyatt et al. | 235/462 |
| 5,717,194 A | 2/1998 | Forbes et al. | 235/462 |
| 5,763,864 A | 6/1998 | O'Hagan et al. | 235/472 |
| 5,770,847 A | 6/1998 | Olmstead | 235/462 |
| 5,777,315 A | 7/1998 | Wilz et al. | 235/472 |
| 5,804,809 A | 9/1998 | Eastman et al. | 235/472 |
| 5,814,803 A | 9/1998 | Olmstead et al. | 235/462 |
| 5,902,998 A | 5/1999 | Olson et al. | 250/221 |
| 5,949,056 A | 9/1999 | White | 235/472.01 |
| 5,949,057 A | 9/1999 | Feng | 235/472.01 |
| 5,988,502 A | 11/1999 | Krichever et al. | 235/454 |
| 5,992,744 A | 11/1999 | Smith et al. | 235/462.11 |
| 6,000,612 A | 12/1999 | Xu | 235/454 |
| 6,069,696 A | 5/2000 | McQueen et al. | 356/326 |
| 6,155,488 A | 12/2000 | Olmstead et al. | 235/440 |
| RE37,166 E | 5/2001 | Rando et al. | 235/462.36 |
| 6,223,986 B1 | 5/2001 | Bobba et al. | 235/462.2 |
| 6,223,988 B1 | 5/2001 | Batterman et al. | 235/472.01 |
| 6,298,176 B2 | 10/2001 | Longacre et al. | 382/313 |
| 6,330,973 B1 | 12/2001 | Bridgelall et al. | 235/462.45 |
| 6,398,112 B1 | 6/2002 | Li et al. | 235/462.01 |
| 6,575,368 B1 | 6/2003 | Tamburrini et al. | 235/462.25 |
| 6,621,063 B2 | 9/2003 | McQueen | 250/208 |

FOREIGN PATENT DOCUMENTS

| | | |
|---|---|---|
| EP | 0690401 A2 | 1/1996 |
| WO | WO 97/28512 | 8/1997 |
| WO | WO 98/16896 | 4/1998 |
| WO | WO 01/29576 A1 | 4/2001 |
| WO | WO 01/82214 | 11/2001 |

OTHER PUBLICATIONS

"Barcode Scanner with Integrated Biometric Identification Device," Research Disclosure Journal, ISSN 0374-4353, Kenneth Mason Publications Ltd., May 1998, 3 pages.

U.S. Appl. No. 09/422,619 of Olmstead et al., filed Oct. 21, 1999 (abnd.) corresponding to WO 01/29576 cited previously.

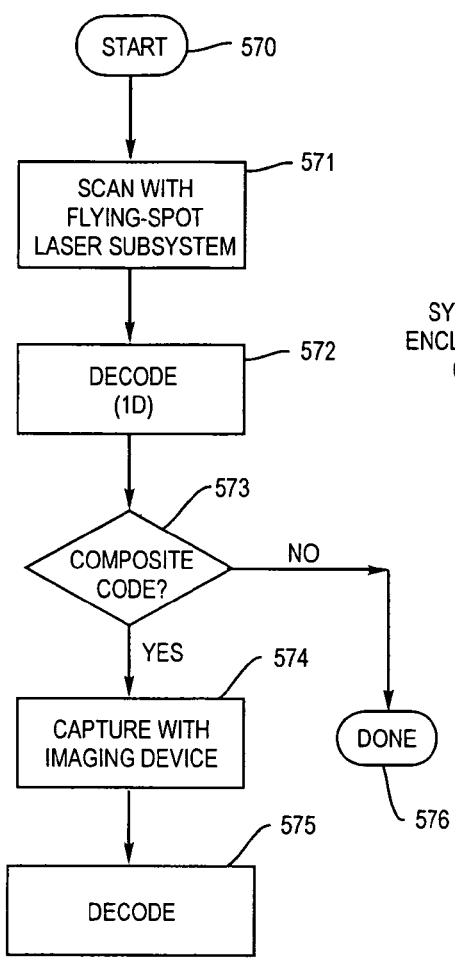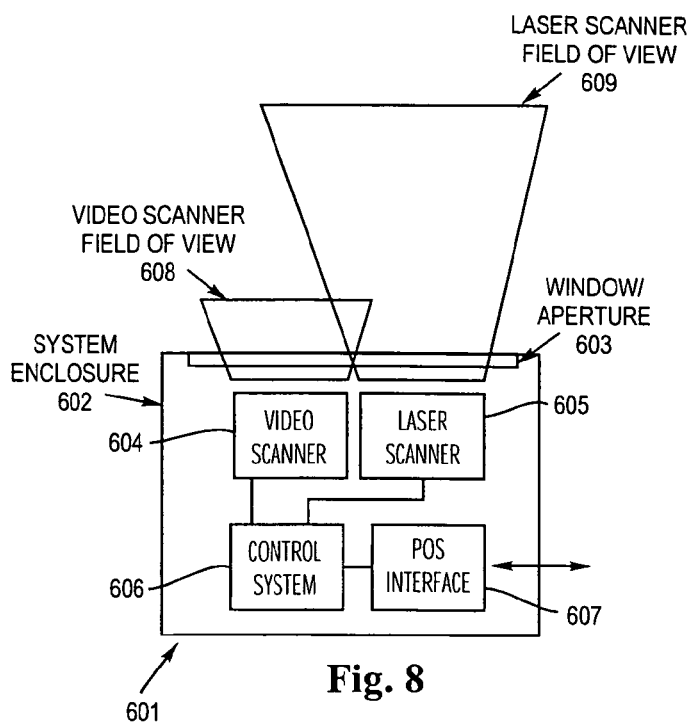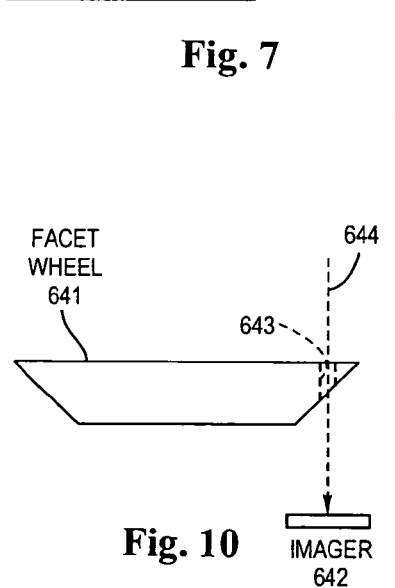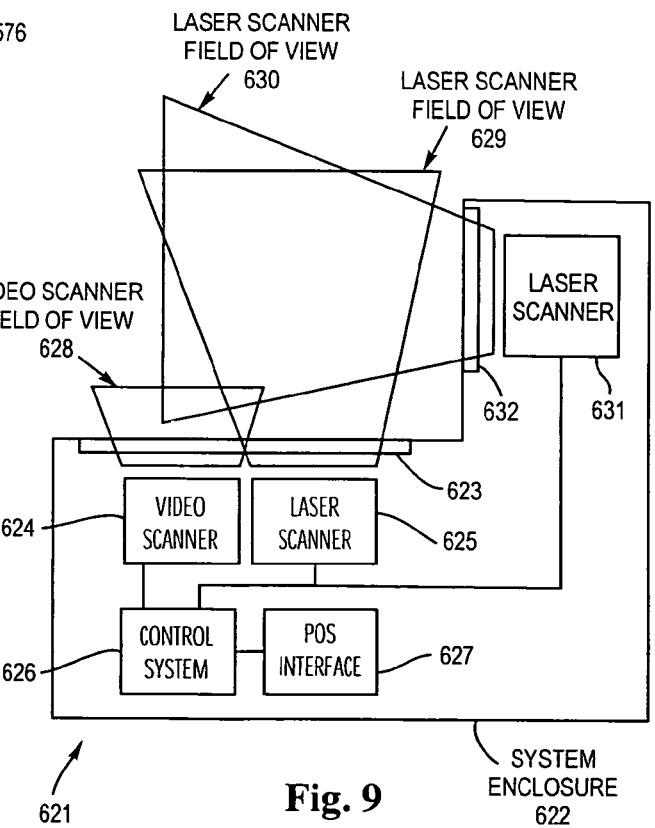

MULTI-FORMAT BAR CODE READER

CROSS REFERENCE TO RELATED APPLICATIONS

This application is a continuation of application Ser. No. 10/247,278, filed Sep. 18, 2002 now U.S. Pat. No. 7,137,555, which is a continuation-in-part of application Ser. No. 09/515,659, filed Feb. 28, 2000, abandoned.

BACKGROUND

The field of the present invention relates to optical reading systems and, more particularly, to optical code readers capable of reading multiple code formats that can selectively read barcodes or other symbols or indicia using either an imaging approach or a flying-spot approach. By combining these two approaches into a single system, the present invention enjoys the benefits of both approaches and avoids many of their drawbacks.

Most, if not all, conventional barcode readers use one of two general approaches to gathering data: either by using a flying-spot laser scanning technique, or by using an imaging technique. In flying-spot laser scanning systems, a beam of light is swept across a target barcode, and the reflected and/or refracted light from the target is detected and processed to decode the barcode. In imaging barcode readers, an image of the barcode is typically captured using an array of pixels (CCD or CMOS, for example), and the captured image is processed to decode the barcode. Either a one dimensional array of pixels or a two-dimensional array of pixels can be used to capture the barcode data. In some CMOS-based imaging systems, several one dimensional arrays of pixels oriented at different angles may be used in a crossing pattern, to provide multi-directional imaging capability.

Because both flying-spot and imaging readers have drawbacks, neither type is optimum for all situations. For example, imaging readers are best suited for situations in which the imaging head can be positioned very close to the target barcode. But if the target barcode is further away, an optical reader relying upon an imaging device for gathering data can have much more difficulty reading the target. This problem is due, in part, to difficulties in focusing images from distant targets onto the CCD or other imaging device, and to difficulties in illuminating a distant target using a local illumination source.

On the other hand, a drawback of handheld flying-spot laser readers is that the scan line (i.e., the path traveled by the scanning spot across the target) must usually be aimed manually at the target barcode, with a relatively high degree of accuracy, for each scan. When all of the barcodes are oriented in the same direction, this drawback is relatively minor. But when the barcodes being scanned are oriented randomly (e.g., when an assortment of products are being checked out at a cashier), the scanning head must be rotated for each scan until the scan line lines up with the axis of the bar code. This random orientation can slow down the scanning process significantly.

An advantage of flying-spot laser scanners is that they generally have a larger depth of field than optical readers using imaging devices. However, it is nevertheless difficult to design a flying-spot laser reader that can read well both distant targets and targets that are very close to the scanning device.

A further drawback of flying-spot laser scanners is that it can be very difficult or even impossible to read two-dimensional barcodes. Two dimensional barcodes and other codes are becoming increasingly common, and include, for example, stacked codes (e.g., Code 16K, Code 49, PDF417, micro-PDF, etc.), matrix codes (e.g., DataMatrix, Code 1, Maxicode, etc.), and RSS codes. Further, two-dimensional codes may be present as part of a composite code or linked code, wherein a one-dimensional barcode appears on the same label as, and indicates the presence of, a two-dimensional barcode. Reading a two-dimensional code with a flying-spot laser scanner is difficult or impossible because the data is read by the flying-spot laser scanner along either a linear scan line caused by the sweeping of the outgoing laser beam, or possibly along several scan lines at different angular orientations, depending upon the scanning pattern.

Accordingly, to read two-dimensional codes, symbols or other indicia, the ability to capture an entire two-dimensional image is generally required. Most commonly, an imaging device is utilized to gather data over a two-dimensional imaging region, and the gathered data is then processed by specialized software algorithms in an attempt to identify features of the two-dimensional code, symbol or other indicia. While optical readers relying solely on an imaging device for gathering data can read two-dimensional bar codes (or in some cases both two-dimensional and one-dimensional bar codes), the relatively small depth of field of such imaging devices, as noted above, limits their usefulness.

There exists a need for an optical reader capable of reading both one-dimensional and two-dimensional bar codes or symbols, that has improved depth of field over optical readers relying solely on an imaging device to capture input data.

SUMMARY

The present invention is directed in one aspect to methods and apparatuses for reading a barcode or other symbol, indicia, character or combination thereof using either a flying-spot laser scanning device or an imaging device, or both, either selectively, sequentially or simultaneously. In a preferred embodiment as described herein, an integrated optical reader is provided, having both a flying-spot laser scanning subsystem and an imaging subsystem. Either, or both, the flying-spot laser scanning subsystem or the imaging subsystem may be utilized to read a target, thereby allowing a single integrated optical reader to obtain the advantages and strengths of each method of gathering data.

Embodiments of various integrated optical readers as disclosed herein may be either handheld (e.g. handheld) or fixed in nature. Particularly in handheld embodiments, various components, such as a lens, a detector, and certain signal processing circuitry, may be shared between the flying spot laser subsystem and the imaging subsystem. In fixed embodiments wherein a viewing window is used, the imaging device of the imaging subsystem may be located at a predefined area (e.g., corner) of the viewing window, or else may be located in the center of the viewing window in various hardware configurations. The predefined area may optionally be denoted by an appropriate marking. In some fixed embodiments, multiple windows are provided, and reading is implemented through each window using either a flying-spot laser scanning subsystem, an imaging subsystem, or both subsystems through the same window.

Provision of both flying-spot laser scanning and imaging enables the reading method to be tailored to the particular type of code that is being read. For example, one dimensional or linear codes may be read using the flying-spot laser subsystem, while two-dimensional codes may be read using the imaging subsystem. In one aspect, the flying-spot laser scanning subsystem may provide a relatively large depth of field, while the imaging subsystem may provide the capability of capturing two-dimensional images and thus allowing more types of codes to be read, albeit with a closer range.

BRIEF DESCRIPTION OF THE DRAWINGS

FIGS. 3 through 7 are flow charts of various processes for selecting between reading by using a flying-spot laser scanning method or by using an imaging method.

FIG. 8 is a diagram of an integrated optical reader illustrating the relative fields of view of a flying-spot laser scanner and an imager.

FIG. 9 is a diagram of an integrated optical reader illustrating the relative fields of view of a multi-planar flying-spot laser scanner and an imager.

FIG. 10 is a diagram of a facet wheel with a hole for allowing an imaging device located beneath the facet wheel to gather data periodically.

DETAILED DESCRIPTION OF THE PREFERRED EMBODIMENTS

Figure 1:
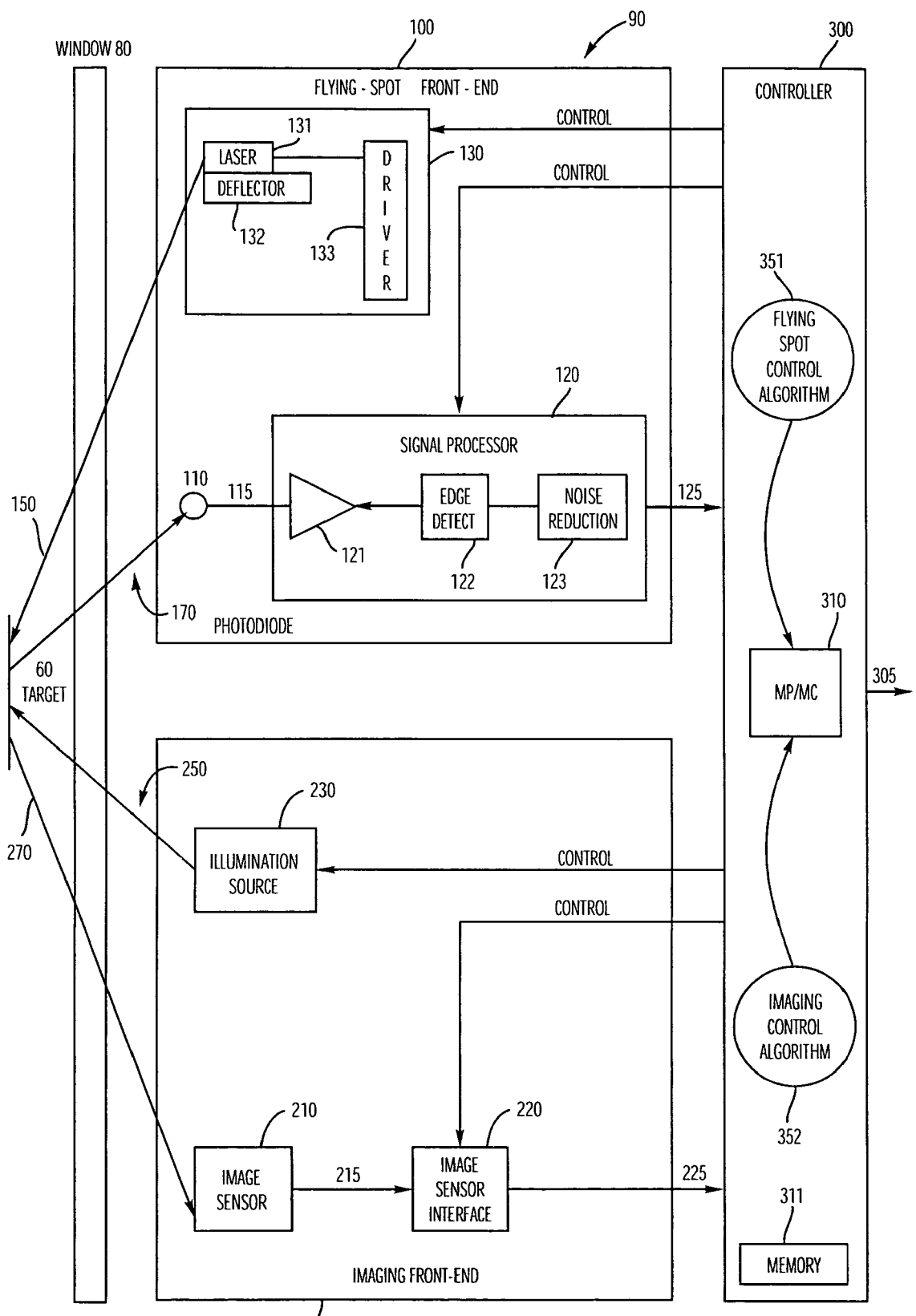
FIG. 1 is a block diagram of one embodiment of an integrated optical reader.

FIG. 1 is a schematic block diagram of a preferred embodiment of an integrated optical reader 90 capable of performing optical reading using a flying-spot laser scanner or a pixel-based imager. The integrated optical reading system 90 depicted in FIG. 1 includes a controller 300, a flying-spot front-end (or subsystem) 100, and an imaging front-end (or subsystem) 200. The flying-spot front-end 100 and the imaging front-end 200 provide output data 125, 225 to the controller 300, and the controller 300 provides control signals to each of the two front-ends 100, 200.

The controller 300 preferably comprises a microprocessor or micro-controller (uP/uC) 310, a sufficient amount of memory to store the necessary program code (such as program code 351 and 352, described later herein) and data, and appropriate glue logic. The design of uP/uC-based controllers is generally well known in the field of imaging readers as well as in the field of flying-spot laser scanners. Alternatively, controllers based on, for example, microprogrammed bit-slice hardware, digital signal processors, or hard-wired control logic may be used instead of a uP/uC-based controller 300.

Reading barcodes or other symbols or indicia using a flying-spot laser scanning method is accomplished by capturing data using the flying-spot front-end 100, and processing the captured data using the controller 300.

The flying-spot front-end 100 preferably includes a beam-former 130, which includes a light source 131 that projects a scanning beam 150 out to the target barcode or other symbol 60. Preferably, the light source 131 comprises a laser diode. Alternatively, other types of light sources, such as a He-Ne laser, other types of lasers, and/or focused beams of non-laser light may be used instead of a laser diode.

The beam-former 130 also preferably includes a laser driver 133 that controls whether the light beam 150 generated by the light source 131 is on or off. Optionally, the laser driver 133 may also control the brightness of the light beam 150. Implementation of the laser driver 133 is conventional in the field of flying-spot scanners, as is the primary interface between the controller 300 and the remaining components of the beam-former 130. The algorithms implemented in the controller 300 for interfacing with the laser driver 133 are also largely conventional.

Scanning with the light beam 150 is accomplished using a beam deflector 132, which is shown in FIG. 1 as part of the beam-former 130. Preferably, the beam deflector 132 comprises an oscillating mirror driven by an oscillating beam dither driver (neither of which is shown in FIG. 1), which are both conventional in the field of flying-spot scanners. Movement of the oscillating mirror causes the scanning light beam 150 to move back and forth, and to thereby trace a line-shaped path over the target barcodes or other target symbols or indicia. In alternative preferred embodiments, other types of beam deflectors (such as, for example, a rotating polygon with a plurality of mirrored facets) may be used instead of a dithering mechanism.

As the scanning beam 150 from the light source 131 sweeps across a target barcode (or other symbol) 60, the scanning beam 150 is reflected by the target 60. Because the "bars" of the barcode 60 have lower reflectivity than the "spaces" between the bars, the amount (or intensity) of reflected light will vary depending on whether the projected spot of scanning beam 150 is incident upon a bar or a space.

Reflected light 170 from the target barcode 60 is collected by appropriate collection optics (which may include lenses and/or collecting mirrors), and directed towards a photodetector such as the photodiode 110 shown in FIG. 1. The design of the collection optics and selection of an appropriate photodetector are conventional in the field of flying-spot scanners. The photodiode 110 converts the variations in the incident light level into an analog signal 115 that is an electrical representation of the physical bar and space widths of the target (e.g., bar code) 60. More generally, the photodiode 110 converts variations in incident light level into an analog signal that has features (i.e., peaks and valleys) which correspond (in width) to the physical width of relatively darker and relatively lighter portions of a symbol, indicia or bar code to be read.

The signal 115 output from the photodiode 110 is then processed by the signal processor 120. Preferably, the signal processor 120 includes an amplifier 121, an edge detector 122, and a noise reduction circuit 123, as illustrated in FIG. 1. Alternative signal processor configurations may also be chosen, as will be apparent to those skilled in the art in view of the descriptions herein.

In a preferred configuration of signal processor 120, the amplifier 121 amplifies the signal 115 output from the photodiode 110. Preferably, the gain of the amplifier 121 is adjusted using an automatic gain control (AGC) system, in which an output of either the amplifier itself or another component (e.g., the noise reduction circuit 105) is fed back to control the gain of the amplifier 121.

The edge detector 122 locates the edges of the amplified signal output from amplifier 121 using any of a variety of techniques that are well known in the art. Suitable techniques of edge detection are described, for example, in U.S. Pat. No. 5,463,211 (Arends et al.) or U.S. Pat. No. 4,000,397 (Hebert et al.), both of which are hereby incorporated by reference as if set forth fully herein. For example, the edge detector 122 may locate edges of the amplified signal output from amplifier 121 by detecting when the second derivative of the amplified signal is zero. A noise reduction circuit 123 eliminates or reduces edges in the amplified signal attributed to noise, and operates for example, by discarding or ignoring edges detected whenever the first derivative of the amplified signal is below a threshold value.

The resulting output signal 125 from the signal processor 120 is a digital signal that contains an edge (i.e., a low-to-high or high-to-low transition) corresponding to each edge (i.e., a dark-to-light or light-to-dark transition) of the target barcode. Alternative output formats may also be used, depending on the selected signal processor configuration. For example, the output signal 125 may be formatted in a run-length encoded or other format. The output signal 125 is provided to the controller 300.

In a preferred uP/uC-based embodiment, the controller 300 includes program code 351 run by the uP/uC 310 for, among other things, controlling the input of data from the flying-spot front-end 100 and for decoding that data. Preferably, the program code 351 is stored in a nonvolatile memory.

Operating under control of the program code 351, the controller 300 receives the digital edge data in the output signal 125 from the signal processor 120. The controller 300 then decodes the digital edge data to interpret the information represented by the target barcode 60 that was scanned by the flying-spot front end 100. Preferably, decoding is accomplished by determining the time segments between the edges contained in the output signal 125 from the signal processor 120. These time segments correspond to the relative widths of the bars and spaces in the target barcode 60. Based on these relative widths, program code 351 is used to decode the information represented in the target barcode 60 in a manner well known to those skilled in the art. Design and implementation of a program 351 for decoding edge data from a flying-spot front-end may be accomplished in any conventional manner, and is considered to be well within the purview of those skilled in the art.

In addition to reading bar codes or other symbols as indicia using a flying-spot front end 100, a preferred integrated optical reading system 90 is also capable of reading bar codes or other symbols or indicia using an imaging method. Reading barcodes using the imaging method is preferably accomplished by capturing data using the imaging front-end 200, and processing the captured data in the controller 300.

In a preferred embodiment, the imaging front-end 200 includes an image sensor 210, an image sensor interface 220, and an illumination source 230. Preferably, the image sensor 210 comprises is a two-dimensional active pixel CMOS array, and the description that follows assumes that this type of image sensor is being used. The image sensor 210 may comprise a rectangular two-dimensional array of CMOS pixels, or else may, for example, comprise several intersecting or crossing linear arrays of CMOS pixels, oriented at different angles. An example of one type of active pixel CMOS array that may be used as image sensor 210 is described in copending U.S. Pat. No. 6,155,488 which is hereby incorporated by reference as if set forth fully herein. Alternative image sensors (such as, e.g., a linear CMOS array, or a one or two dimensional charged coupled device (CCD)) may be used instead of a two-dimensional active pixel CMOS array, if appropriate modifications are made to the readout circuitry and signal processing particulars, as will be apparent to those skilled in the art in view of the disclosure herein.

When the imaging front-end 200 is being used to capture an image, the illumination source 230 is activated to illuminate the bar code, symbol or other target 60. Preferably, the illumination source 230 comprises a row of light emitting diodes (LEDs). Other types of illumination sources (including, e.g., flash strobes and incandescent or fluorescent lamps) may be used instead of LEDs. As another possible alternative, the illumination source may be omitted altogether, and the imaging front-end 200 can rely on ambient light to illuminate the target barcodes. Various types of ambient light imaging systems are described, for example, in U.S. Pat. Nos. 5,770,847 and 5,814,803, both of which are incorporated by reference as if set forth fully herein.

Light 250 from the illumination source 230 (and/or ambient light) is reflected from the target barcode 60 or other symbol or indicia and detected by the image sensor 210. As noted, a preferred image sensor 210 is constructed as an active pixel CMOS device containing a two-dimensional array of pixels. Each pixel of the image sensor 210 detects the amount of light incident at its particular location and stores an electrical charge that varies as a function of the incident light. After the image sensor 210 has been exposed to the light 270 reflected by the target, data from all the CMOS pixels is sequentially read out in a selectable pattern (which may be row-by-row, column-by-column, or some other pattern). The data read out from the image sensor 210 results in the generation of an analog video output signal 215.

The image sensor interface 220 conditions the analog video output signal 215 received from the image sensor 210 and generates an output signal 225 that generally identifies which regions of the image correspond to light areas, and which correspond to dark areas. Either analog or digital signal processing (which may include, for example, amplification and/or filtering) may be utilized in the image sensor interface 220. Preferably, the image sensor interface 220 sets the exposure time and thresholding so that the bars or relatively darker regions of the barcode or other target are reported as being dark, and the spaces or relatively lighter regions between the bars or darker regions are reported as being light, according to any of a number of techniques well known in the art. Exposure control techniques are described, for example, in copending U.S. Pat. No. 6,155,488, previously incorporated herein by reference. The image sensor 210 and the image sensor 220 may be contained in the same integrated circuit.

The output signal 225 of the image sensor interface 220 may comprise binary digital image data, with the two output states corresponding to the dark and light regions (i.e., pixels) of the image. Alternatively, the output signal 225 may comprise gray-scale pixel data, or else may comprise run-length encoded binary data. To obtain gray-scale pixel data, the analog video output signal 215 may be converted to digital form (represented by any suitable number of bits, depending upon accuracy requirements and component tolerances) by the image sensor interface 220 using an analog-to-digital (A/D) converter. To obtain run-length encoded binary data, the analog video output signal 215 may be edge-detected in a manner similar to the photodiode output signal 115 of the flying-spot front-end 100.

The output of the image sensor interface 220 is provided to the controller 300. Transfer of the digital image data of the image sensor interface output signal 225 from the interface 220 to the controller 300 may be accomplished by any of a number of suitable techniques. For example, the image sensor output signal 225 may be in the form of binary video information, in which the lines of video information are sent one at a time, sequentially, with the data from individual pixels sent sequentially within each line. Alternatively, the image sensor interface 220 may load the digital image data of the image sensor interface output signal 225 into a memory 311, such as a dual-port or shared random-access memory (RAM), which could then be accessed by the controller 300. As yet another alternative, the image sensor interface 220 may load the digital image data of the image sensor interface output signal 225 into a first-in-first-out (FIFO) buffer (not shown). Other approaches to transferring the digital image data of the image sensor interface output signal 225 from the interface 220 to the controller 300 may also be used, as will be apparent to those skilled in the art.

In the preferred uP/uC-based embodiment, the controller 300 includes program code 352 run by the uP/uC 310 for inputting data from the imaging front-end 200, and for decoding that data. The program code 352 also controls, among other things, the illumination source 230 and the image sensor interface 220. Preferably, the program code 352 is stored in nonvolatile memory. Optionally, the data from the imaging front-end 200 may be pre-processed so that it will have the same format as the data generated by the flying-spot front-end 100. When such pre-processing is implemented, a single decoding algorithm may be used for decoding the data from the flying-spot front-end 100 and the data from the imaging front-end 200.

Operating under control of the program code 352, the controller 300 receives the digital image data of the image sensor interface output signal 225 from the image sensor interface 220. The handling of the inputted image data depends upon the format in which it was sent. For example, if the image sensor interface 220 generates binary video information, the controller 300 will preferably take this data and store it in memory 311 (e.g., RAM), so that the controller 300 will have access to the entirety of the pixel data necessary for decoding.

After receiving the digital image data of the image sensor interface output signal 225, the controller 300 then decodes the image data to determine the information represented by the target barcode, symbol, or other indicia contained within the captured image. Preferably, decoding is accomplished by identifying which areas of the image contain barcodes or symbols or recognizable portions thereof, and then determining the information represented by those barcodes based on the patterns of light and dark pixels within the identified areas. Decoding capabilities may be provided for any of a variety of different symbologies, including, for example, linear symbologies (e.g. UPC and code 39), Stacked symbologies (e.g., PDF417), and matrix symbologies (e.g., data matrix and Maxicode). Design and implementation of program code 352 for controlling the imaging front-end 200 and for decoding the captured image data is considered well within the purview of those skilled in the art.

Alternatively, as noted previously herein, instead of using a two-dimensional CMOS imaging array, the imaging front-end 200 may use a one-dimensional CMOS imaging array (i.e., a linear array) or a linear CCD array that only images a single line of a target at a time. Such a linear imaging array may be used to build up a two dimensional image by moving either the imaging sensor 200 or the target across the field of view of the linear array, and capturing successive one-dimensional scans. The resulting built-up image may be stored in a RAM, and, once captured, can be processed in the same manner as the two-dimensional image described above. As yet another alternative, a one-dimensional image captured by a one-dimensional CMOS imaging array (or linear CCD array) may be processed directly. In some circumstances, however, such a technique might require a more precise alignment of the image sensor 210 with the target barcode or other symbol or indicia as compared to the two-dimensional system described above.

A preferred integrated optical reader 90 incorporates both a flying-spot front-end 100 and an imaging front-end 200 into a single system. In such an embodiment, the controller 300 is able to select a desired reading method, and to use the selected method to try to read a target barcode, symbol or other indicia. Preferably, both front-ends 100, 200 are housed in a single housing behind a single window 80 that is transparent to the relevant frequencies of light. The integrated optical reader 90 may be either employed as a fixed optical reader or as a handheld optical reader.

When it is desired to read a barcode symbol or other indicia by scanning it with a flying-spot laser, the controller 300 selects and executes program code 351. When program code 351 is executing, the controller 300 provides appropriate control signals to the flying-spot front-end 100, receives input data from the flying-spot front-end 100, and decodes that data, as described previously herein.

When it is desired to read a barcode symbol or other indicia using an imaging technique, the controller 300 selects and executes program code 352. When program code 352 is executing, the controller 300 provides appropriate control signals to the imaging front-end 200, receives input data from the imaging front-end 200, and decodes that data, as described previously herein.

The output data 305 from the controller 300 represents the information or value of one or more target barcodes, symbols or other indicia and may be provided in any desired parallel, serial or other format including, for example, a Centronics, RS232, or Universal Serial Bus (USB) format.

In one embodiment, the output data 305 from the controller 300 is always provided in the same format, regardless of which front-end 100, 200 was used to read the target barcode or symbol. This embodiment has the advantage of making the particulars of the front-end processing transparent to downstream recipients of the output information. Alternatively, if it would be advantageous for the downstream recipients to know the data source (e.g., in a diagnostic mode), a data bit or field indicative of the data's origin may be sent from the controller 300 together with the output data 305. Alternatively, the output data 305 from the controller 300 may be presented in different formats depending on which front-end 100, 200 was used for reading.

The decision to use either the flying-spot front-end 100 or the imaging front-end 200 in a given situation may be based on any of a variety of criteria, conditions or techniques. A relatively simple approach uses a two-position mechanical switch (not shown), which is preferably mounted on the imaging/scanning head, to select the desired front-end. For this approach, the operator manually moves the switch to a first position when desiring to read using the imaging front-end 200, and moves the switch to a second position when desiring to read using the flying-spot front-end 100. An alternative mode selector, such as a momentary pushbutton switch combined with a mode-indicator display (e.g., an LED) may be used instead of a mechanical switch. The operator may be trained to select the imaging front end 200 for nearby objects, and to select a flying-spot front end 100 for more distant objects. The operator may instead choose, using either of the switching techniques referred to above, or any other suitable switching technique involving manual initiation, to select the imaging front end 200 for reading two-dimensional barcodes, and to select the flying-spot front-end 100 for reading one-dimensional barcodes.

In another embodiment, the integrated optical reader 90 initially defaults to one of two modes (e.g., the imaging mode) for each target, and switches to the other mode (e.g., the flying-spot mode) when the user squeezes a trigger switch on the imaging/scanning head. Such an approach provides an advantage over conventional flying-spot scanners because it enables barcodes or other symbols to be optically read even when the trigger is not pressed (using the imaging mode). At the same time, this approach provides an advantage over conventional imaging readers because it can read barcodes or other symbols at a much greater distance. The trigger may also be used to activate an aiming beam when squeezed lightly, in a manner that is conventionally known.

In yet another embodiment, the operator can switch modes of the integrated optical reader 90 by scanning a specialized symbol which, when read and interpreted by the integrated optical reader 90, causes the controller 300 to switch reading modes. The controller 300 may maintain an internal mode flag (i.e., a stored data bit) in software indicating the current reading or operation mode, and may change the mode flag, if appropriate, when the specialized symbol is read.

In yet another embodiment, a host system such as a cash register may send the scanner a command causing a mode change. For example a system may ordinarily use the laser scanner mode to scan normal modes items (such as those items containing a one dimensional code) and switch to the imaging mode when requested to read a special such as an ID card bearing a multi-dimensional code.

Figure 5:
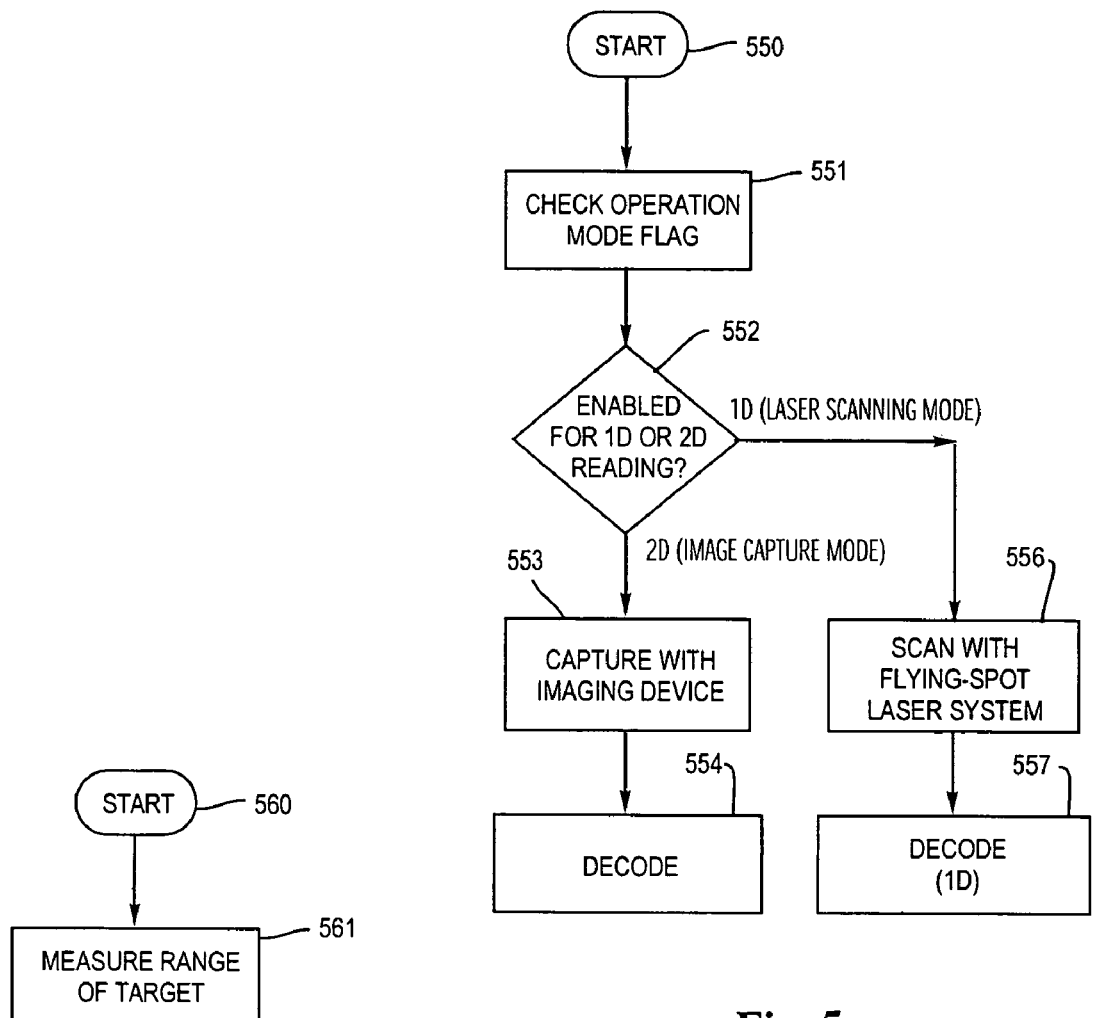

FIG. 5 is a flow chart illustrating one embodiment of process by which selection between the flying-spot front end 100 and the imaging front end 200 may be accomplished by the controller 300. As illustrated in FIG. 5, in a first step 551, the controller 300 reads an operation mode flag. The value of the operation mode flag may be set by, for example, a mechanical switch or trigger, as described above, or by reading a specialized symbol, as also described above. In a next step 552, a test is performed to see whether the operation mode flag is enabled for flying-spot laser scanning or for imaging. Alternatively, the operation mode flag may indicate whether the integrated optical reader is in an operation mode for reading one-dimensional symbols or for reading two-dimensional symbols, but the effect is similar: for one-dimensional symbols, reading with the flying-spot front end 100 is preferred, while for two-dimensional symbols, reading with the imaging front end 200 is preferred. Thus, if the operation mode flag is selected for one-dimensional symbols (or, alternatively, for flying-spot scanning), then the controller 300 selects, in step 556, the flying-spot front end 100 for reading. The data gathered by the flying-spot front end 100 is then processed and transferred to the controller 300 for decoding, in step 557. If, on the other hand, the operation mode flag is selected for two-dimensional symbols (or, alternatively, for imaging), then the controller 300 selects, in step 553, the imaging front end 200 for reading. The data gathered by the imaging front end 200 is then processed and transferred to the controller 300 for decoding, in step 554.

Figure 3:
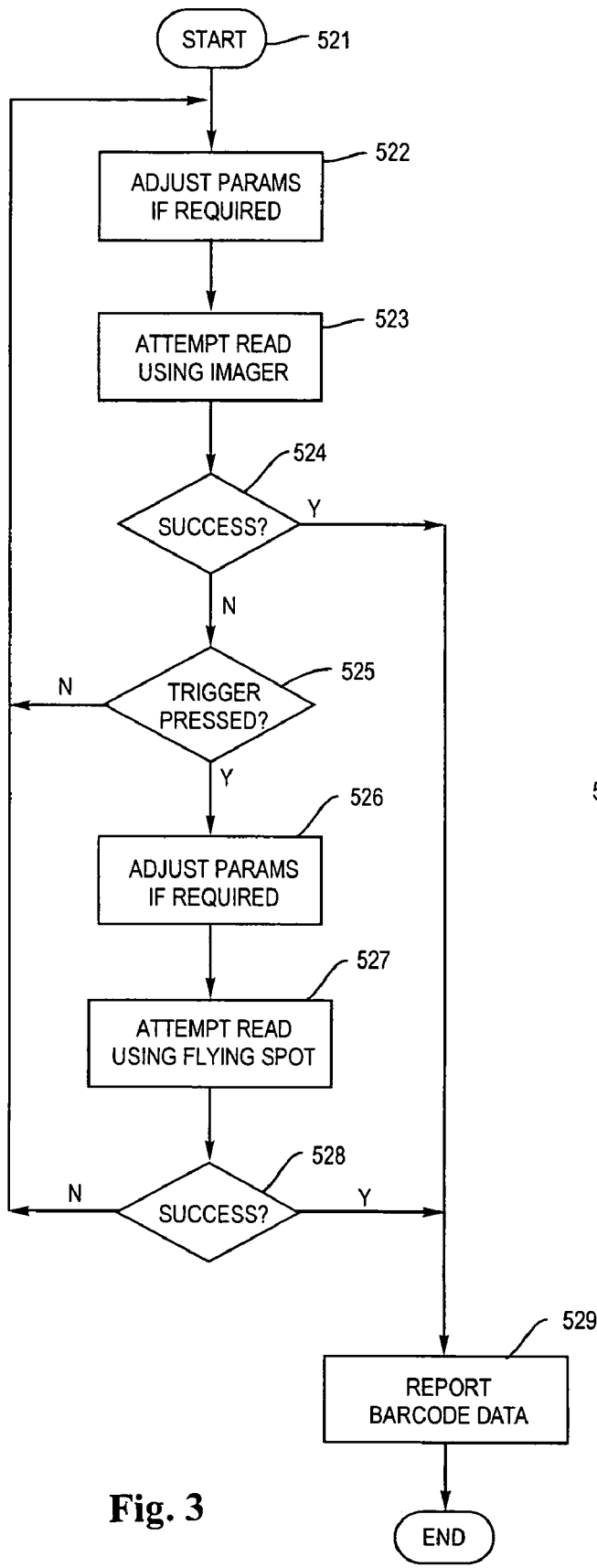

In another embodiment, the integrated optical reader 90 attempts to read the target barcode or other symbol or indicia using one of the two methods (flying-spot or imaging), and switches to the other method if the first method fails, thus alternating between the two reading methods. FIG. 3 is a flowchart of a control program in accordance with such an embodiment. The program represented by the flow chart in FIG. 3 is preferably implemented by the controller 300 (shown in FIG. 1).

In accordance with the flow chart as shown in FIG. 3, the controller 300 starts execution at step 521. In step 522, the controller 300 adjusts the parameters for the upcoming imaging read, preferably based on previously performed imaging reads. These parameters may include, for example, exposure control for the imaging process. Then, in step 523, the controller 300 attempts to read the target barcode (or other symbol or indicia) using the imaging front-end 200. This step 523 may include, for example, exposure control, clocking the data out of the CCD or other image sensor, and decoding of the data from the CCD as described previously herein.

Next, in step 524, a test is preformed to determine whether the attempted read (in step 523) was successful. If the attempted read was successful, processing jumps to step 529, where the data corresponding to the target barcode or other symbol or indicia is reported. If, on the other hand, the attempted read in step 523 was not successful, processing passes to step 525, which is the start of the flying-spot scanning routine.

In step 525, a test is performed to determine whether the trigger switch on the handheld head has been pressed. If the trigger switch has not been pressed, the system will not attempt to read the barcode or other symbol or indicia using a flying-spot scan, and control returns to step 522 so that another attempt can be made using an imaging read. The test of step 525 may be included for safety reasons, to prevent, for example, the unintentional discharge of laser light.

If the test of step 525 determines that the trigger has been pressed, control then passes to step 526, where the controller 300 adjusts the parameters for the upcoming flying-spot scan, preferably based on previously performed flying-spot scans. These parameters may include, for example, the speed of the scanning spot. Next, in step 527, the system attempts to read the target barcode using a flying-spot scan. Details of implementing this step (including, for example, reading and decoding the edge data) have been described previously herein.

Next, in step 528, a test is performed to determine whether the attempted read (in step 527) was successful. If the attempted read was successful, processing continues in step 529, where the data corresponding to the target barcode or other symbol or indicia is reported. If, on the other hand, the attempted read in step 527 was not successful, processing returns to step 522, which is the start of the imaging reading routine. This process is repeated to effectuate reading of the bar code, symbol or other indicia.

A number of variations to the program depicted in FIG. 3 will be apparent to those skilled in the art upon review of the specification, drawings and claims herein. For example, instead of switching between the imaging and flying-spot reading modes after each unsuccessful reading attempt, the system may remain in either of those modes until a predetermined number of unsuccessful reading attempts have occurred.

In another embodiment, the integrated optical reader 90 alternates between reading with the flying-spot front end 100 and the imaging front end 200, and performs data capture using one reading method in parallel with decoding data gathered using a different reading method.

Figure 4:
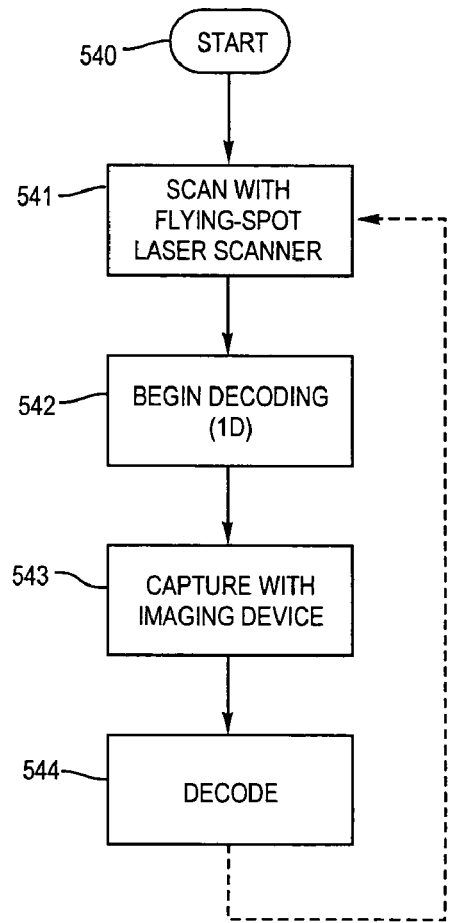

A flow chart depicting such an operational process is shown in FIG. 4. According to the process shown in FIG. 4, the controller 300 starts execution in step 540. In step 541, the integrated optical reader 90 first attempts to read with the flying-spot front end 100. The flying spot front end 100 is selected first because the decoding time is generally less, although in alternative embodiments the imaging front end

200 may be selected first. In a next step 542, the data gathered by the flying spot front end 100 is processed and transferred to the controller 300 for decoding. At or around the same time, the controller 300 switches the reading mode, and selects the imaging front end 200 to read in data. Thus, the integrated optical reader 90 operates in parallel, decoding data gathered from one source (the flying spot front end 100) while gathering data from another source (the imaging front end 200). After the data is gathered by the imaging front end 200, the data is processed and sent to the controller 300 for decoding, in step 544. While decoding of the data gathered by the imaging front end 200 is in progress, the cycle may repeat, and the controller 300 may switch back to reading with the flying spot front end 100, in step 541.

An advantage of the processes shown in FIGS. 3 and 4 is that both near and far targets may be read, without the need for manual selection between different modes. According to the process of FIGS. 3 and 4, the integrated optical reader 90 performs automatic switching between the modes, thus reducing the need for manual intervention in its operation.

In one preferred embodiment, when using both the flying spot front end 100 and the imaging front end 200 in an automated fashion, the operation of the two front ends 100, 200 is synchronized so that they are not operating simultaneously. The reason for this is because the flying spot laser beam traversing the target may interfere with collection of good data by the imaging front end 200. Thus, simultaneous operation of both the flying spot front end 100 and the imaging front end 200 may degrade performance of the imaging front end 200.

In an alternative preferred embodiment, a band-stop or "notch" filter may be installed in front of the imaging sensor in the imaging front end 200. Preferably, this notch filter rejects light with wavelengths that match the flying-spot laser, and passes most other wavelengths of light that can be sensed by the imaging sensor. In particular, the notch filter should pass most of the light that is used to provide illumination for the imaging front end. When such a notch filter is used, the operation of the flying-spot front end 100 will not interfere with the operation of the imaging front end 200, so both of those front ends can be operated simultaneously, provided that sufficient processing power is available is the controller 300. This processing power may be provided by a single microprocessor that is sufficiently powerful to handle both tasks simultaneously, or by providing two individual processors, one for each front end.

Optionally, data from the imaging front-end 200 may be used to confirm the validity of data obtained from the flying-spot front-end 100 or vice versa. This confirmation process can be used to decrease the probability of a reading error in cases where the barcode or other symbol can be successfully decoded, but the confidence level in the decoding result is low. Thus, if the flying-spot subsystem decodes a given barcode or other symbol with a low degree of confidence, an imaging read can be performed to verify the data. Then, if the imaging sub-system detects the same information for the given barcode or symbol, the original data reading can be accepted. This process is particularly advantageous when the data confidence is relatively low for both the imaging and flying-spot reads, but the combined confidence is high enough to be usable. For example, if the confidence in the imaging read is 90%, and the confidence in the flying-spot scan is 95%, the resulting confidence would be 1−(0.1×0.05), or 99.5%. If the level of confidence is sufficient, this process of confirmation can result in a successful scan from a pair of reading attempts that would otherwise be too unreliable to use.

In various other embodiments, the integrated optical reader 90 may first read using one reading method (e.g., using the flying spot front end 100), and then switch to the other reading method based upon data derived in a partial pattern recognition step (or a partial decoding step). In accordance with one such embodiment, the controller 300 causes data to be gathered using the flying-spot front end 100. The controller 300 then performs a partial pattern recognition (or partial decoding) step to search for indicia indicative of either a one-dimensional or two-dimensional code, symbol or indicia. The partial pattern recognition (or partial decoding) step takes less time than a full decode, because the particular value or specific information of the barcode or symbol is not needed at this stage of the processing. If initial processing of the gathered data indicates that the bar code (or other symbol or indicia) is one-dimensional, based, for example, on the feature ratios of a portion of the data, or by detecting a striped pattern, or by detecting certain key features (such as center and/or guard bands), then the controller 300 may continue to attempt to decode on the assumption that the target comprises a one-dimensional code, symbol or indicia, and may also instruct the flying spot front end 100 to continue to gather data continuously or periodically in case complete data was not initially read.

If, on the other hand, initial processing of the gathered data indicates that the bar code (or other symbol or indicia) is two-dimensional, based, for example, on the feature ratios of a portion of the data, or by detecting certain key features (such as start/stop characters in PDF417, or a Maxicode bullseye), then the controller 300 may switch to an image capture mode, and cause the imaging front end 200 to capture an image for decoding. The controller 300 may either discard the original data gathered by the flying spot front end 100, or maintain it and use it to assist decoding of the data gathered by the imaging front end 200.

In one embodiment as described herein, an integrated optical reader (such as integrated optical reader 90 shown in FIG. 1) includes a proximity detection capability, by which the distance from the optical reader 90 to the target may be determined. Various proximity detection techniques are conventionally known, and have been utilized, for example, in camera-related applications for performing such tasks as automatic focusing. In various embodiments of integrated optical readers as described herein, selection between the flying-spot front end 100 and imaging front-end 200 is based, in whole or in part, on information from a proximity detector, as further described below.

Figure 2:
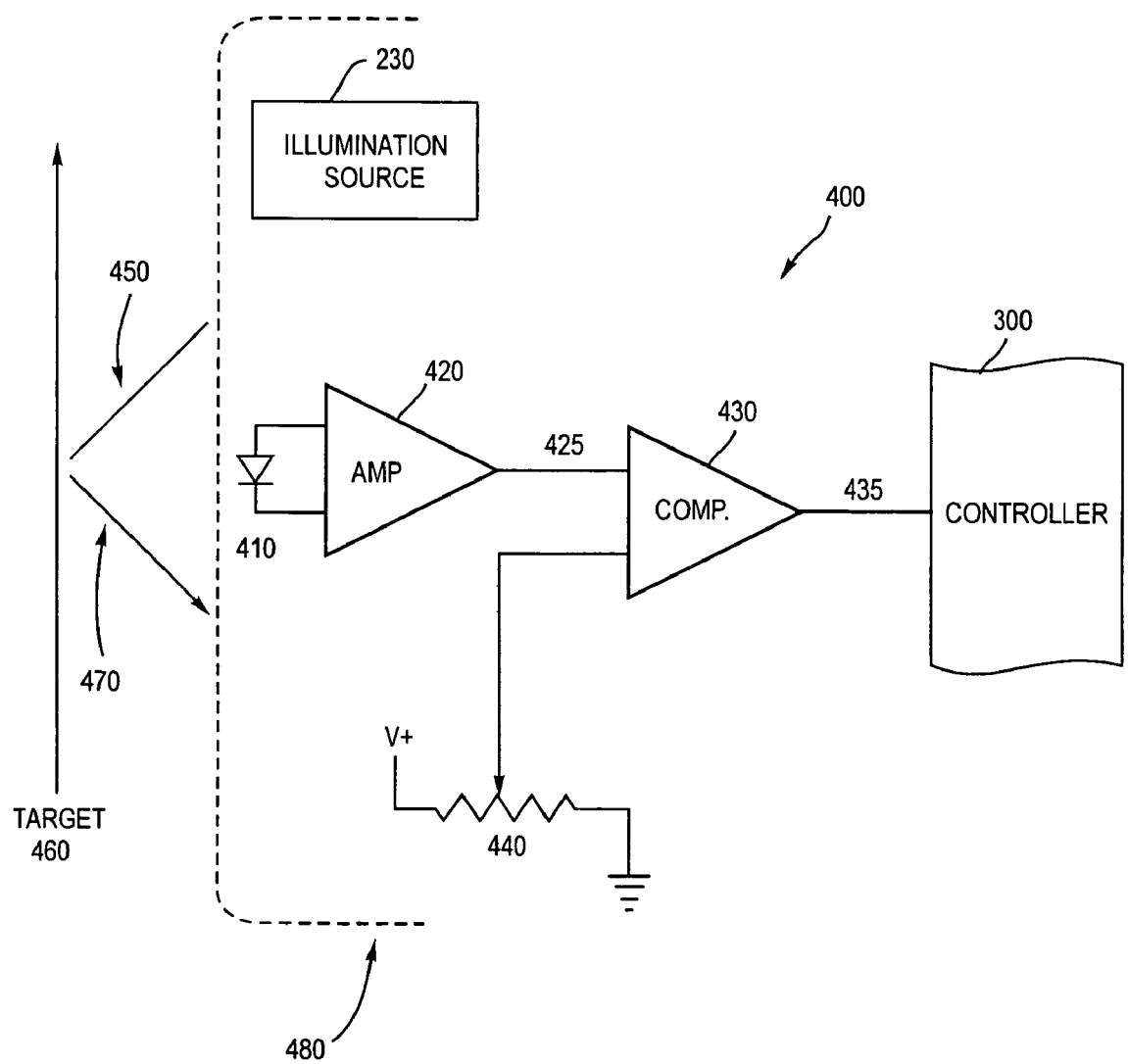
FIG. 2 is a block diagram of a proximity detector for use in an integrated optical reader as described herein.

FIG. 2 is a schematic block diagram of one type of proximity detector 400 that may be used to detect whether a target is near or far. When incorporated in the integrated optical reader 90, the controller 300 selects the imaging front-end 200 for near targets and the flying-spot front end 100 for far targets based on an output of the proximity detector 400. Preferably, the proximity detector 400 is integrated into a handheld imaging/scanning head.

The illustrated proximity detector 400 makes use of the existing illumination source 230 (e.g., a forward-facing LED array) located in the imaging front-end 200, together with an additional forward-facing photodetector 410. Preferably, this added photodetector 410 comprises a photodiode with a peak detecting frequency that matches the frequency of the light from the illumination source 230. The output of the photodetector 410 is amplified by a transimpedance amplifier 420. The transimpedance amplifier's output 425 is then compared to a preset threshold voltage by, for example, a comparator 430.

Because the illumination source 230 and the photodetector 410 are both forward-facing, the photodetector will detect light from the illumination source 230 that has been reflected by the target 460. When the target 460 is near (for example, less than one inch from the front of the imaging/scanning head 480), the amount of reflected light will be relatively large, and the amplifier output 425 will exceed the preset threshold. When the target is far away, on the other hand, the amount of reflected light detected by the photodetector 410 will be smaller, and will not exceed the preset threshold. The controller 300 then uses the output of the comparator 435 to decide whether to perform an imaging scan (for near targets) or a flying-spot scan (for far targets).

The proximity detector 400 may be referred to as a "near/far proximity detector" because it simply outputs an indication of whether the target 460 is near or far, but not necessarily the precise distance of the target 460. However, with suitable modification (e.g., additional threshold levels to provide range "buckets", or analog-to-digital conversion of the amplifier output signal 425), a closer estimate of the distance to the target 460 can be achieved, if desired for other purposes (e.g., auto-focus).

Figure 6:
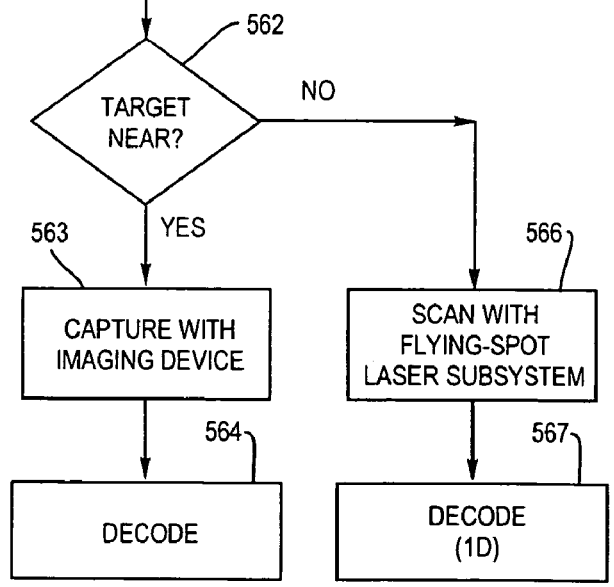

FIG. 6 is a flow chart illustrating a technique for selecting between flying-spot scanning and imaging when proximity information is available. As illustrated in FIG. 6, the controller 300 starts execution in step 560. In step 561, the range to the target 460 is measured using a proximity detector (e.g., proximity detector 400 shown in FIG. 2). The output from the proximity detector is tested step 562. If the target 460 is near, then, in step 563, the controller 300 selects the imaging front-end 200. The data gathered by the imaging front-end 200 is then processed and sent for decoding in step 564. If, on the other hand, the target 460 is not near, then, in step 566, the controller 300 selects the flying-spot front end 100. The data gathered by the flying-spot front end 100 is then processed and sent for decoding in step 567.

Should step 561 not result in a determination of target distance (i.e., the proximity detector 400 is unable to detect the target), typically the near/far proximity detector 400 will output an indication that the target is "far" because the target 460 will not be present to reflect light on the photodetector 410. Thus, in the absence of a target or a definitive reading from the proximity detector, the controller 300 may choose to default, or may naturally default, to using the flying-spot front end 100.

Besides the proximity detector 400 illustrated in FIG. 2, other types of proximity or range detectors may be used. For example, an ultrasonic sonar-based proximity detector may be utilized. Another example of a proximity detector is described in copending U.S. patent application Ser. No. 09/422,619 filed on Oct. 21, 1999, which application is assigned to the assignee of the present invention, and hereby incorporated by reference as if set forth fully herein.

In a variation of the process shown in FIG. 6, if the proximity detector determines that the target is not near, but the integrated optical reader 90 fails to read the target using the flying spot front end 100, then the controller 300 causes the integrated optical reader 90 to issue an audible beep having a recognizable tone or pattern, indicating to the operator to move the target close, within the range and field of view of the imaging front end 200.

In another embodiment, the imaging front end 200 is selected by the controller 300 in response to reading of a specialized linear (i.e., one-dimensional) code indicating that a two-dimensional bar code, symbol or indicia is present. A flow chart illustrating an operational process in accordance with such an embodiment is illustrated in FIG. 7. As shown in FIG. 7, the controller 300 starts execution in step 570. In step 571, the flying-spot front end 100 is used to gather data. In the next step 572, the data gathered by the flying-spot front end 100 is processed and transferred to the controller 300 for decoding. In step 573, the controller 300 determines whether the data is in the format of a composite, or linked, code, indicating that a two-dimensional bar code, symbol or indicia is present. If not, then the process is done (unless no code was detected, in which case the process may return to step 571). If, however, a composite or linked code was present, the process then continues with step 574, wherein the imaging front end 200 is used to gather data. In step 575, the data gathered by the imaging front end 200 is processed and transferred to the controller 300 for decoding.

Figure 12:
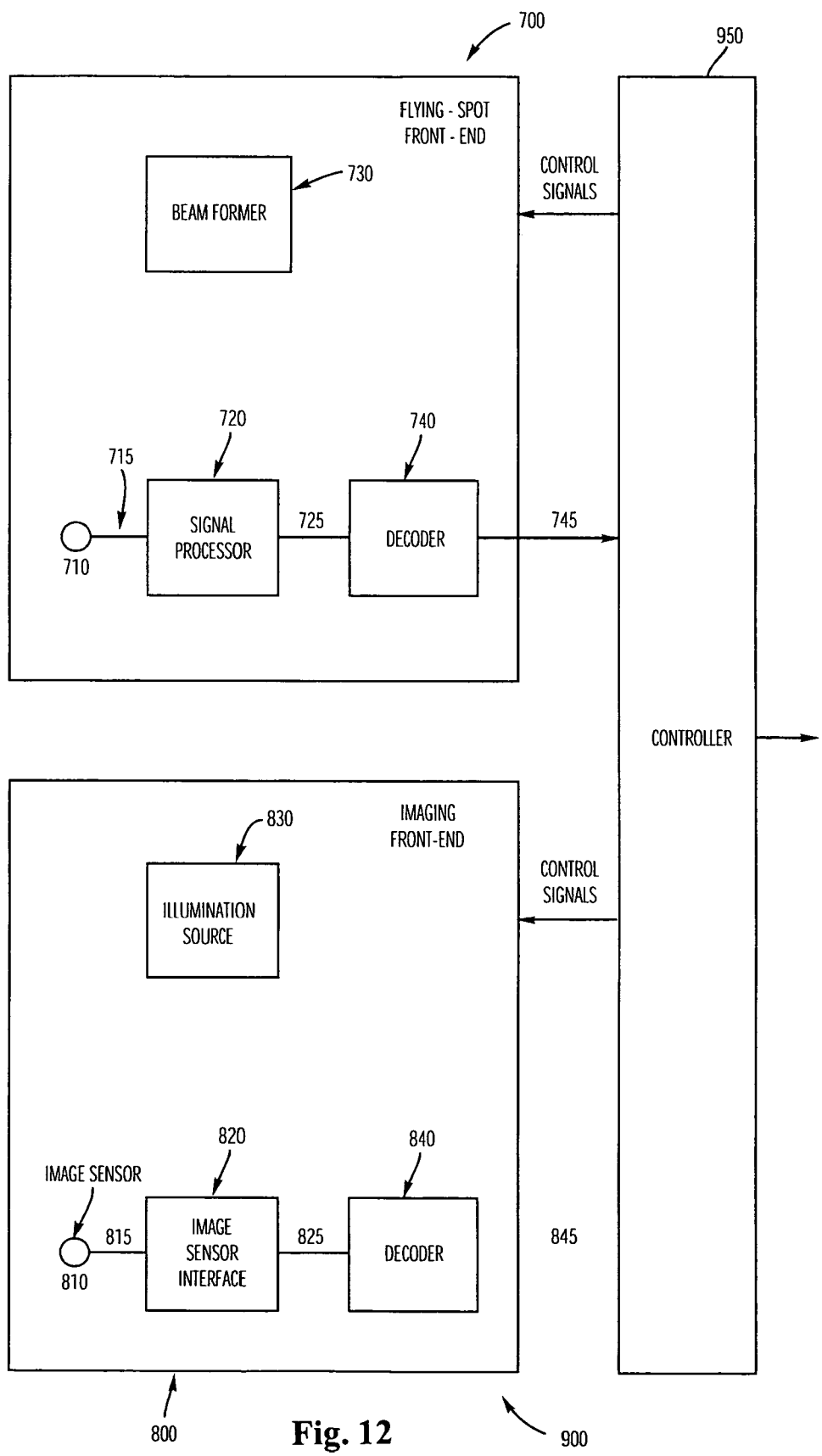
FIG. 12 is a schematic block diagram of another embodiment of an integrated optical reader.

FIG. 12 is a block diagram of an alternative embodiment of an integrated optical reader 900 similar to the embodiment shown in FIG. 1, except that instead of transferring undecoded data 725, 825 from the front-ends 700, 800 to the controller 950, the decoding function is performed locally in each individual front-end 700, 800. More specifically, the undecoded edge data in the signal processor output signal 725 is decoded in a local flying-spot decoder 740 of any suitable conventional design, and the undecoded image data 825 is decoded in a local imaging decoder 840 of any suitable conventional design. The decoders 740, 840 may be uP/uC-based. Both decoders 740, 840 may provide their output in the same format (e.g., ASCII data), thus simplifying the design of the controller 950. When used in conjunction with a switch for selecting the desired front-end 700 or 800, as described earlier herein, the controller 950 may be implemented in hardware using a simple 2-to-1 multiplexer to route the data from the desired front-end 700, 800 to the output. Alternatively, the controller 950 may be uP/uC-based, or may comprise a finite state machine, field-programmable gate array (FPGA), or logic network, or may have any other hardware- or software-based architecture.

FIG. 8 is a diagram of an integrated optical reader 601 embodied as a fixed device. As illustrated in FIG. 8, the integrated optical reader 601 includes a system enclosure 602 having a window (or aperture) 603 atop it, such as may be found at, for example, a retail store or in other point-of-sale applications. The integrated optical reader 601 further comprises a flying-spot laser scanner front end 605 (such as flying spot front end 100 shown in FIG. 1 and described earlier herein) as well as an imaging front end 604 (such as imaging front end 200 shown in FIG. 1 and described earlier herein), both of which are connected to a control system 606 (such as controller 300 shown in FIG. 1). In operation, the control system 606 selectively operates the flying spot front end 605 and the imaging front end 604, so as to gather data over the respective fields-of-view 609, 608 of the two front ends 605, 604. Selection between the flying spot front end 605 and the imaging front end 604 may be made according to any of the techniques described elsewhere herein, in connection with FIGS. 3-7, for example. Data gathered by the flying spot front end 605 and imaging front end 605 may be decoded locally in each front end 605, 604, or else may be decoded by the controller 626. Data gathered by, or decoded by, the control system 606 may be passed along to a host computer (not shown) through an interface 607.

While FIG. 8 depicts that the imaging field of view 608 and the laser scanner field of view 609 are both inputted through a single aperture or window 603, individual windows may be provided for each of those fields of view in alternative embodiments. In such embodiments (not shown), the imaging reader 604 would be located behind one window, and the laser scanner 605 would be located behind a second window. When multiple windows are used, the windows may be located in a single plane, either adjacent to each other or located some distance apart. Alternatively, the windows may be located in two different planes, oriented to provide any desired field of view.

The imaging front end 604 may be located so that the components for the imaging front end 604 are a sufficient distance away from the flying spot front end 605 that they do not interfere with the operation (e.g., generation of the scanning pattern) of the flying spot front end 605. In one embodiment, a special area of the window 603, such as a corner section thereof, is designated for reading two-dimensional bar codes, symbols or indicia, and the imaging front end 604 is located beneath that area of the window 603. Optionally, the location of this designated region of the window 603 may be denoted using any suitable markings including, for example, outlining the boundary of the designated region on the window 603, using an arrow pointing to the designated region, or using an appropriate text message.

Limiting the systems image-capturing capabilities to a designated region of the window 603 can result in significant cost savings, because providing imaging over the entire window 603 with sufficient resolution to obtain useful images would require an imaging sensor with a very large number of pixels. Such sensors are generally much more expensive than smaller imaging sensors.

Operators may be trained to recognize labels bearing two-dimensional bar codes, symbols or indicia, and to place such labels above and relatively close to, or touching, the special area of the window 603, so as to allow the imaging front end 604 to read the two-dimensional bar code, symbol or indicia. Such labels are preferably presented very close to the imaging front end 604, such as by placing them on the window 603, because the imaging device of the imaging front end 604 would ordinarily have a limited depth of field. However, one-dimensional bar codes, symbols or other indicia may still be presented to the flying spot front end 605 anyplace over its typically much larger depth of field.

Optionally, imaging may be provided at two or more special areas of the windows 603 (e.g., at each of the four corners of the imaging window 603). In yet another alternative embodiment, instead of providing multiple non-contiguous imaging areas on the window 603, multiple imaging sensors may be configured to provide images of two or more contiguous areas. In embodiments that use more than one window 603 and more than one image sensor, the imaging sensors may optionally be arranged behind different windows. When more than one imaging sensor is used, the sensors may be configured to have fields of view that are limited to designated regions of the window. In such cases, the designated regions may be marked as described above in connection with the single-window embodiments. When more than one imaging sensor is used, a single signal processor may be used to process the image data from all of the sensors.

Alternatively, a duplicate copy of the signal processing hardware may be provided for each sensor.

In a variation of the above embodiment, when the control system 606 (including a decoder internal thereto) decodes a one-dimensional bar code or symbol that is part of a linked or composite code, or the control system 606 recognizes data from a linear scan by the flying spot front end 605 indicating that a two-dimensional bar code, symbol or indicia is present, the control system 606 causes a signal to be conveyed to the operator, such as by sounding an audible beep or by illuminating a light-emitting diode (LED) located externally in a visible part of the system enclosure 602. Such a signal indicates to the operator that the label should be positioned near or on top of the special area of the window 603, so that the imaging front end 604 can attempt to read a two-dimensional bar code, symbol or other indicia.

FIG. 9 is a diagram of an integrated optical reader 621 similar to the integrated optical reader 601 shown in FIG. 8, but having an additional flying spot laser scanning front end 631 for multi-planar scanning. Thus, like the integrated optical reader 601 shown in FIG. 8, the integrated optical reader 621 of FIG. 9 includes a system enclosure 622 having a window (or aperture) 623, through which a flying spot front end 625 and an imaging front end 624 may gather data. The system enclosure 622 also has an upper part having a window (or aperture) 632 generally perpendicular to the plane of the window 623. The second flying spot front end 631 is positioned so as to scan through the window 632 in the upper part of the system enclosure 622, and is connected to the controller 626. In operation, similar to the embodiment of FIG. 8, the data gathered by the flying spot front end 631 may be decoded locally therein, or may be sent to the controller 626 for decoding, or, alternatively, may be sent to a host computer (not shown) via an interface 627 for decoding.

While the embodiment illustrated in FIG. 9 depicts the imaging front end 624 as being located behind the horizontal window 623, the imaging front end in alternative embodiments 624 may look out through the vertical window 632 instead. Optionally, imaging may be implemented through both windows 623, 624 by providing suitable hardware behind each of those windows. In other alternative embodiments, the second field of view may be provided from another angle (e.g., from above). In still other alternative embodiments, more than two fields of view may be provided. For example, a field of view may be provided from below, from one or more sides, and from above. Optionally, any of these fields of view may be implemented using a flying-spot front end and/or an imaging front end. In such embodiments, the field of view for imaging may optionally be limited to a subregion of the relevant windows, which may optionally be marked as described above.

In an embodiment such as shown in FIG. 8 or FIG. 9, the system may comprise a housing having a window; an imaging subsystem having an imaging sensor aimable at targets positioned in front of a designated region of the window, but not in front of non-designated regions of the window; and a flying-spot laser scanner subsystem having a field of view that reads bar code symbols positioned in front of at least some of the non-designated regions of the window. Preferable the non-designated regions are larger than the designated regions. For example, the non-designated regions may be at least four times as large as the area of the designated region. Alternately, the non-designated regions may be at least ten times as large as the area of the designated region.

In some instances, it may be desirable to have the field of view of the imaging front end located in the center of the window 603 (FIG. 8) or 623 (FIG. 9). However, where the flying spot front end uses a facet wheel to generate a scanning pattern, there may be little room for an imaging device. In one embodiment, the imaging device (e.g., CCD or CMOS imager) and lens for the imaging front end are suspended above the facet wheel but underneath the window 603 (or 623), using a cantilever arm to hold the lens and imaging device. A wire may be run along the cantilever arm to allow electronic signals from the imaging device to reach signal processing electronics and, eventually, an image capture memory and/or decoder. Appropriate markings may optionally be provided to denote the field of view of the imaging device.

In various embodiments as described herein, components are shared between the imaging front end and the flying spot front end, so as to reduce the number of total components needed and thereby reduce cost, size and/or power consumption. An example of such an embodiment is described later herein with respect to FIG. 11. If, however, the laser utilized by the flying spot front end 605 (in FIG. 8) or 625 (in FIG. 9) is retrodirective, then challenges may be presented in sharing components between the flying spot front end and the imaging front end.

FIG. 10 illustrates a facet wheel 641 with a hole 643 for allowing an imaging device 642 located beneath the facet wheel 641 to gather data periodically. Generally, when the facet wheel 641 spins, a flying spot scanning pattern is generated according to techniques well known in the art. However, when the hole 643 passes above the imaging device 642, the imaging device 642 is provided an unobstructed view above it, and captures data during that time. The facet wheel 641 may be temporarily stopped to allow the imaging device 642 to gather data over a longer exposure time.

In another embodiment, a shared imaging device (preferably a two-dimensional active pixel CMOS array) is used for both flying spot scanning and imaging. When capture of a two-dimensional image is desired, the facet wheel is stopped in an orientation such that a view is provided down the centerpath of the integrated optical reader. The captured image can then be transferred from the imaging device to a memory and/or decoder. When flying spot reading is desired, the facet wheel is rotated. A selected group of pixels on the imaging device (such as a 40×40 area of pixels) is preferably used as a readout area to "emulate" a photodiode in the flying spot scanner—that is, to gather light reflected from the target and focused by the optical system onto the imaging device, and provide a signal to processing and decoding parts of the system downstream. The data from the readout area of the imaging device is read out periodically, at a rate dependent in part upon the speed with which the beam is swept and the desired resolution, so as to yield a stair-step analog (video) signal, having signal features (i.e., peaks and valleys) corresponding to the lighter and darker features of the target. Using an active pixel CMOS array allows selection only of the pixels in the readout area for each read, avoiding the need to read out the entire contents of the imaging device, and permitting a higher readout rate.

Preferably, the number of pixels selected for the readout area of the imaging device approximates the size and/or light sensitivity of a photodiode. As with a photodiode in a flying spot scanner, the size of the image (that is, spot) on the imaging device will vary depending upon how distant the target is. Thus, when the object is far away, the size of the spot will be relatively small, and when the object is close, the size of the spot will be relatively large. The area of the imaging pixel selected for use as the readout area for flying spot scanning thus depends upon the expected size of the spot over the operable range of the optical reader.

In a variation of the above embodiment, a proximity detector or ranging device is used to optimize the readout area of the imaging device. When the proximity detector indicates that the target is close, the spot would be expected to be large, and so a larger area of pixels would be read out. Conversely, when the proximity detector indicates that the target is distant, the spot would be expected to be small, and so a smaller area of pixels would be read out. The size of the readout area can be varied dynamically from close to distant targets, in direct proportion to the target distance. A proximity detector of the type disclosed in U.S. patent application Ser. No. 09/422,619, previously incorporated herein by reference, may be used in the aforementioned embodiment.

Figure 11:
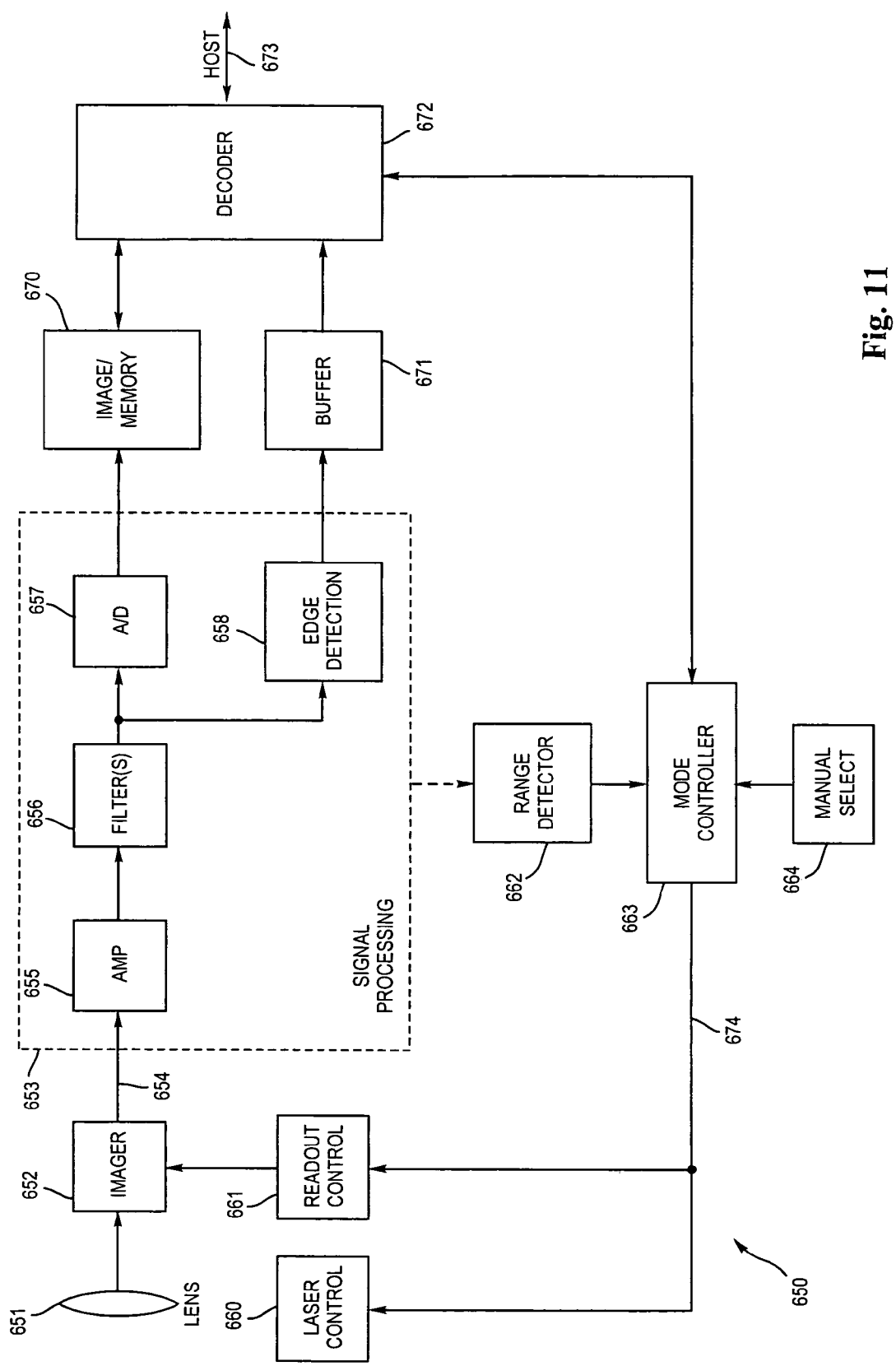
FIG. 11 is a diagram of an integrated optical reader as may be implemented in a handheld optical reading device.

FIG. 11 is a diagram of an integrated optical reader 650 as may be particularly well suited for a handheld optical reading device. As shown in FIG. 11, an integrated optical reader 650 comprises a lens 651 for focusing light from a target (not shown) onto an image sensor 652. The image sensor 652 may comprise any of the imaging devices previously mentioned herein, such as a CCD or CMOS array, for example. Preferably, for reasons explained below, the image sensor 652 comprises a two-dimensional active-pixel CMOS array.

The sensor array 652 is connected to a signal processor 653, which may comprise an amplifier 655 (with or without automatic gain control circuitry), a filter circuit 656, an A/D converter 657 and an edge detection circuit 658. The A/D converter 657 may be connected to a memory 670 for storing captured images (as well as for storing program variables, data and the like), and the edge detection circuit 658 may be connected to a buffer 671. Both the memory 670 and the buffer 671 are accessible to a decoder 672 (or a controller). The decoder 672 preferably comprises a microprocessor or microcontroller and program code for causing the microprocessor or micro-controller to perform certain functions in accordance with the description herein.

A readout control circuit 661 is connected to the image sensor 652. The readout control 661 may comprise, for example, clocking circuitry to read out the pixels of the imaging array 652 sequentially, or in a particular pattern, in addition to logic circuitry for responding to commands from the mode controller 663. The readout control 661 may also comprise adaptive exposure control circuitry, such as described in relation to an active-pixel CMOS image sensor in copending U.S. patent application Ser. No. 08/697,408, U.S. Pat. No. 6,155,488 hereby incorporated by reference.

In operation, the image sensor 652 is exposed for an amount of time (either a fixed or adaptive time period), and the image captured by the image sensor 652 is clocked out under control of the readout control circuit 661. The image sensor output signal 654 is provided to the signal processor 653, which amplifies and filters the signal, and then either digitizes the signal using A/D converter 657 (if in imaging mode) or else detects transitions in the signal using edge detection circuitry 658 (if in flying-spot scanning mode). The operation of the signal processor 653 is dictated by the mode controller 663, which indicates to the various circuitry of the optical reader 650 whether the optical reader 650 is in an imaging mode or a flying spot scanning mode. Laser control circuitry 660 (including a beam former and other such circuitry as described in relation to elements 131 through 133 in FIG. 1) is preferably included to permit flying-spot laser scanning capability.

If in imaging mode, the digitized data from A/D converter 657 is transferred to a data structure in memory 670 for storing the image data, for subsequent processing by the decoder 672. If in flying spot scanning mode, the edge detection data from edge detection circuitry 658 is preferably run-length encoded and transferred to buffer 671, for subsequent processing by the decoder 672.

The mode of the integrated optical reader 650 may be manually selected using a switch or other manual selection means as previously described herein. Alternatively, the mode controller 663 may be connected to a range detector 662, which detects the proximity of the target and indicates such to the mode controller 663. If the target is near, the mode controller 663 may select the imaging mode, whereas if the target is not near, the mode controller may select the flying spot scanning mode. The range detector 662 may share certain circuitry with the image sensor 652 and signal processor 653 (in order to obtain ranging information), and therefore is shown optionally connected to the signal processor 653. Alternatively, the range detector 662 may be stand-alone in nature.

If in imaging mode, the image data from the image sensor 652 is clocked out and processed much in the same manner as with the imaging front end 200 shown in FIG. 1. If, however, the integrated optical reader 650 is in flying spot scanning mode, then certain modifications are made, so as to permit the laser scanning circuitry to share some of the components with the imaging circuitry. In particular, as described with respect to the device shown in FIG. 10, a selected group of pixels on the imaging sensor 652 (e.g., a 40×40 area of pixels) is preferably used as a readout area to "emulate" a photodiode in the flying spot scanner. The data from the readout area of the imaging sensor 652 is read out periodically, at a rate dependent in part upon the speed with which the beam generated by the laser control 660 is swept and upon the desired resolution. The image sensor output signal 654 thereby comprises a stair-step analog (video) signal, having signal features (i.e., peaks and valleys) corresponding to the lighter and darker features of the target.

Using an active pixel CMOS array for the image sensor 652 allows selection only of the pixels in the readout area for each read, avoiding the need to read out the entire contents of the imaging device, and permitting a higher readout rate. Preferably, as noted with respect to certain embodiments relative to FIG. 10, the number of pixels selected for the readout area of the imaging sensor 652 approximates the size and/or light sensitivity of a photodiode, and depends in part upon the expected size of the spot over the operable range of the optical reader 650 when used in flying-spot scanning mode.

In one variation of the above, the range detector 662 is used to optimize the readout area of the imaging sensor 652. Suitable examples of range detectors are described in U.S. patent application Ser. No. 09/422,619, previously incorporated herein by reference. When the range detector 662 indicates that the target is close, the spot would be expected to be large, and so a larger area of pixels would be read out from the imaging sensor 652. Conversely, when the range detector 662 indicates that the target is distant, the spot would be expected to be small, and so a smaller area of pixels would be read out. The size of the readout area can be varied dynamically from close to distant targets, in direct proportion to the target distance.

Integrated optical readers in accordance with various preferred embodiments described herein advantageously enable a user to read near barcodes, symbols, or other indicia using an imaging technique, without sacrificing the ability to read distant barcodes, symbols, or other indicia (which can be read using a flying-spot scan). In addition, because the imaging front-end 200 (or 800) can be used to read near barcodes, symbols, or other indicia, the design of the flying-spot front-end does not need to accommodate near barcodes, symbols, or other indicia. As a result, the flying-spot front-end 100 (or 700) can be optimized for a larger depth of field when reading distant barcodes and other symbols and indicia. The integrated optical reader in accordance with the preferred embodiments described herein also enables the user to read two-dimensional barcodes using imaging, and one-dimensional barcodes using flying-spot scans.

In various embodiments of an integrated optical reader as described herein, an auto-focus capability may be provided. Typically, in such embodiments, a component in the optical path is adjusted in response to an indication of the distance to the target as derived by the optical reader. Such an adjustable component may comprise, for example, a lens or a mirror in the optical path. A proximity detector, including any of the types previously described or referred to herein, or any other suitable proximity detector or ranging mechanism as conventionally known, may be used to sense the distance to the target and adjust the focus of the integrated optical reader in response thereto. Alternatively, the focus of the integrated optical reader may be adjusted to optimize for high frequency information in response to analysis of the image data, according to any of a variety of techniques that are well known in the art.

In various embodiments as described herein, a multi-focal lens may be used. In particular, a multi-focal lens may be used to increase the depth of field of the optical system, particularly for the imaging front end 200. A variety of multi-focal lenses and other optical techniques which may be utilized in conjunction with the embodiments described herein are set forth in U.S. Pat. Nos. 5,770,847 and 5,814,803, each of which is hereby incorporated by reference as if set forth fully herein.

Optionally, Scheimpflug optics may be used in any of the imaging applications described above to provide increased depth of field. The use of Scheimpflug optics in imaging systems is described in U.S. patent application Ser. No. 09/884,975 (filed Jun. 21, 2001), which is incorporated herein by reference. Using Scheimpflug optics for the imaging front end is particularly advantageous when reading linear bar codes (e.g., UPC, code 39, etc.), but may also be appropriate in certain circumstances for stacked bar codes or a Maxicode type of code. The use of Scheimpflug optics is particularly advantageous when an imaging front end is located at a significant distance from the symbol being read. For example, an imaging device that uses Scheimpflug optics may be incorporated into a ceiling mounted device in a supermarket setting, aimed down at the checkout counter.

In the various embodiments as described herein, the type of data that may be read and captured by the image front end of an integrated optical reader is not limited to bar codes and similar symbols. Any type of data or image may be captured by the image front end, including any type of symbols, characters, or pictures (e.g., driver's license photos). Where such data is amenable to decoding, the controller of the integrated optical reader may attempt to decode it; alternatively, the data may be passed along to a host system, or stored locally for later read-out. When character data is captured, conventional OCR (optical character recognition) techniques may be used to discern which characters have been imaged, either locally in the controller or in a remote host system.

The imaging system in the embodiments described above may also be use to capture biometrics information such as fingerprints, signatures, or handprints. For example, the imaging front end may be used to read a fingerprint in response to an operator placing their finger on the imaging area of the window. The imaging front could then capture an image of the operator's fingerprint, which could then be compared to other fingerprints in a local library. Alternatively, the image of the fingerprint may be exported to an external device for processing. In cases where the imaging window is sufficiently large, an image of the entire handprint of the operator may be captured and analyzed (e.g., by comparing its gross anatomic features to other handprints, either locally or in a remote processor).

Although the present invention has been described above in the context of certain preferred embodiments, it is to be understood that various modifications may be made to those embodiments, and various equivalents may be substituted, without departing from the spirit or scope of the invention.

What is claimed is:

1. An optical reading system for reading optical codes on items at a checkout stand, comprising
   a fixed optical reader including a housing having a window;
   an imaging reading subsystem disposed in the housing and including an imaging sensor that detects an image of a target and an image sensor interface that generates data based on the image detected;
   a flying-spot scanner subsystem disposed in the housing and including a beam-former that scans a spot of light in a complex pattern out through the window and across the target to read optical codes positioned in various orientations and a photodetector that detects light reflected by the target and generates an output based on the light detected;
   a controller in communication with the imaging reading subsystem and the flying-spot scanner subsystem;
   a proximity detector for detecting proximity of the target,
   wherein the controller selects between the imaging reading subsystem and the flying-spot scanner subsystem based upon proximity of the target as detected by the proximity detector.

2. A system according to claim 1 wherein the controller selectively activates one of the imaging reading subsystem and the flying-spot scanner subsystem.

3. A method for reading optical codes on a target object, comprising the steps of
   providing a fixed optical reader with (1) a housing including a window, (2) an imaging reader subsystem and (3) a flying spot scanner subsystem generating a complex scan pattern out through the window and having a field of view that reads optical codes positioned in various orientations within a scan region;
   passing the target object into the scan region;
   sensing range to the target to be read;
   the optical reader automatically selecting one of the imaging reading subsystem and the flying-spot scanner subsystem to read the target based upon the range to the target being sensed.

4. A method according to claim 3 wherein the step of sensing range comprises determining whether the target is at close range or distant and the step of reading selecting comprises reading the target with the imaging reader subsystem if the target is determined to be at close range and reading the target with the flying-spot scanner subsystem if the target is determined to be distant.

5. A system for reading optical codes on items at a checkout stand, comprising:
   a fixed optical reader including a housing having a window;
   a first optical reading subsystem comprising an imaging reader disposed in the housing, said imaging reader comprising a two-dimensional imaging sensor having a field of view to read targets positioned in front of a small designated region of the window, but not in front of non-designated regions of the window;
   a flying-spot laser scanner subsystem generating a complex scan pattern out through the window and having a field of view that reads optical codes positioned in various orientations within a scan region extending in front of at least a predominant portion of the window.

6. A system according to claim 5 and further comprising an optical filter disposed in an incoming light path of the imaging sensor, but not in the incoming path of the flying-spot laser scanner subsystem, for reducing amplitude of light of a wavelength corresponding to light produced by the flying-spot laser scanner subsystem from reaching the imaging sensor.

7. An optical code reading system, comprising:
   a housing;
   a flying-spot scanner subsystem disposed in the housing and generating a scanning beam out from the housing for reading an optical code on target object in a scan region;
   an imaging reader subsystem disposed in the housing, said imaging reader subsystem comprising an imaging sensor for reading a target object in a designated field of view;
   an optical filter disposed in an incoming light path of the imaging sensor, but not in the incoming path of the flying-spot scanner subsystem, for reducing amplitude of light of a wavelength corresponding to the scanning beam from the flying-spot scanner from reaching the imaging sensor.

8. A method for optically reading a target object, comprising the steps of
   providing an optical reader with (1) an imaging reader subsystem and (2) a flying spot scanner subsystem;
   reading a target object using a first one of the subsystems to obtain a first read of the target object;
   if confidence level of the first read is low, reading the target object using a second one of the subsystems to obtain a second read of the target object;
   if the second read of the target object detects the same information as the first read of the target object, accepting the read.

9. A method for optically reading a target object, comprising the steps of
   providing an optical reader with (1) an imaging reader subsystem and (2) a flying spot scanner subsystem;
   partially reading the target object using one of the subsystems to obtain a partial pattern recognition of the target object;
   selecting a first one of the subsystems to first read the target object based on the partial pattern recognition obtained;
   using the selected first one of the subsystems to read the target object.

* * * * *

UNITED STATES PATENT AND TRADEMARK OFFICE
CERTIFICATE OF CORRECTION

PATENT NO.        : 7,246,747 B2
APPLICATION NO. : 11/500630
DATED             : July 24, 2007
INVENTOR(S)       : Bremer et al.

It is certified that error appears in the above-identified patent and that said Letters Patent is hereby corrected as shown below:

Column 5
Line 48, delete "is" after "comprises".

Column 11
Line 42-43, before "the controller" change "is" to --from--.

Signed and Sealed this

Seventh Day of April, 2009

JOHN DOLL
*Acting Director of the United States Patent and Trademark Office*